(12) United States Patent
Dickie

(10) Patent No.: US 12,710,172 B2
(45) Date of Patent: Aug. 18, 2026

(54) BIKE HORN WITH SOUND ACTIVATED LIGHT

(71) Applicant: Brightz, Ltd., Ottawa Lake, MI (US)

(72) Inventor: Samantha Dickie, Canton, MI (US)

(73) Assignee: BRIGHTZ, LTD., Ottawa Lake, MI (US)

( * ) Notice: Subject to any disclaimer, the term of this patent is extended or adjusted under 35 U.S.C. 154(b) by 0 days.

(21) Appl. No.: 19/210,345

(22) Filed: May 16, 2025

(65) Prior Publication Data

US 2025/0354685 A1 Nov. 20, 2025

Related U.S. Application Data

(60) Provisional application No. 63/649,072, filed on May 17, 2024.

(51) Int. Cl.

| | |
|---|---|
| ***F21V 33/00*** | (2006.01) |
| ***B62J 3/04*** | (2020.01) |
| ***B62J 3/10*** | (2020.01) |
| ***B62J 3/14*** | (2020.01) |
| ***B62J 6/015*** | (2020.01) |

(Continued)

(52) U.S. Cl.

CPC ............. *F21V 33/0076* (2013.01); *B62J 3/04* (2020.02); *B62J 3/10* (2020.02); *B62J 3/14* (2020.02); *B62J 6/015* (2020.02); *B62J 6/26* (2020.02); *F21V 23/0442* (2013.01); *F21V 33/0056* (2013.01); *F21W 2103/00* (2018.01);

(Continued)

(58) Field of Classification Search

CPC ... B62J 6/028; B62J 6/015; B62J 6/057; B62J 3/04; B62J 3/14; B62J 3/02; B62J 6/26; F21V 23/0442; F21V 33/0056

USPC .................................................. 362/473, 475

See application file for complete search history.

(56) References Cited

U.S. PATENT DOCUMENTS 4,992,704 A * 2/1991 Stinson .................. H05B 45/40 362/800

7,506,989 B2 * 3/2009 Tomassetti ............... G08B 7/06 362/186

(Continued)

FOREIGN PATENT DOCUMENTS

DE 202020102646 U1 * 7/2020 ................ B62J 3/12

OTHER PUBLICATIONS

Machine translation of DE-202020102646, published Jul. 14, 2020 (Year: 2020).*

*Primary Examiner* — William N Harris

(74) *Attorney, Agent, or Firm* — Vorys, Sater, Seymour and Pease LLP; Rex W. Miller, II

(57) ABSTRACT

An illuminated bike horn includes a ring attached to a mouth of the bike horn. The illuminated bike horn further includes a light source and sound sensor coupled between the bike horn and the ring. The light source provides illumination in response to the bike horn emitting sound generated in response to movement of a diaphragm coupled to a bell of the bike horn. The light source is a light emitting diode (LED) configured to provide illumination in a plurality of colors. The LED provides illumination for a predetermined period of time during and after the bike horn emits sound. The light source and sound sensor are powered by batteries. The batteries, light source, and sound sensor are secured to bay of a back side of the ring between the bay and a cover. The illuminated bike horn further includes a clamp to attach the bike horn to a handlebar.

20 Claims, 11 Drawing Sheets

(51) Int. Cl.

| | |
|---|---|
| ***B62J 6/26*** | (2020.01) |
| ***F21V 23/04*** | (2006.01) |
| ***F21W 103/00*** | (2018.01) |
| ***F21W 107/13*** | (2018.01) |
| ***F21Y 113/13*** | (2016.01) |
| ***F21Y 115/10*** | (2016.01) |

(52) U.S. Cl.
CPC ...... *F21W 2107/13* (2018.01); *F21Y 2113/13* (2016.08); *F21Y 2115/10* (2016.08)

(56) References Cited

U.S. PATENT DOCUMENTS

| | | | | |
|---|---|---|---|---|
| 7,520,635 | B2 * | 4/2009 | Wolf | F21V 23/0435 362/276 |
| 7,604,378 | B2 * | 10/2009 | Wolf | F21V 19/006 362/85 |
| 10,874,232 | B2 * | 12/2020 | Honig | F21V 33/0036 |
| 11,796,168 | B1 * | 10/2023 | Yin | F21V 23/0442 |
| 2009/0308301 | A1 * | 12/2009 | Chen | B62J 50/40 116/3 |
| 2011/0304268 | A1 * | 12/2011 | Bertram | F21K 9/232 315/51 |
| 2014/0118128 | A1 * | 5/2014 | Orzeck | B62J 6/16 340/432 |
| 2019/0394547 | A1 * | 12/2019 | Lemons | H04R 1/028 |
| 2020/0037418 | A1 * | 1/2020 | Kasle | H05B 45/20 |
| 2020/0304914 | A1 * | 9/2020 | Mata Magana | H04R 1/025 |
| 2021/0199280 | A1 * | 7/2021 | Cho | H05K 5/0234 |
| 2021/0372595 | A1 * | 12/2021 | Jung | G06F 3/041 |
| 2023/0254616 | A1 * | 8/2023 | Xu | H04R 1/028 381/398 |

* cited by examiner

BIKE HORN WITH SOUND ACTIVATED LIGHT

CROSS-REFERENCE TO RELATED APPLICATIONS

The present application claims priority to provisional application No. 63/649,072 filed May 17, 2024, the disclosure of which is hereby incorporated by reference in its entirety.

FIELD OF THE DISCLOSURE

The present disclosure relates generally to an illuminated horn and, more particularly, to a bike horn with sound-activated illumination.

BACKGROUND OF THE DISCLOSURE

Bike horns are devices that are mounted on bicycles to allow a cyclist to warn others of the cyclist's presence. Bike horns likely became popular as bicycle accessories in the 19$^{th}$ century, as well as other bike safety devices, such as bells. These bike horns were mechanical devices that emit sound through vibration of a diaphragm or resonator. Currently, bike horns have evolved to include electronic systems that can emit a variety of sounds to suit modern and noisy urban environments. Additionally, cyclists can use a bike horn during daylight hours, but sound alone is insufficient to alert others of the cyclist's presence in evening hours when visibility is low.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, an illuminated bike horn includes a ring attached to a mouth of the bike horn. The illuminated bike horn further includes a light source and sound sensor coupled between the bike horn and the ring. The light source provides illumination in response to the bike horn emitting sound. Accordingly, the bike horn emits sound in response to movement of a diaphragm coupled to a bell of the bike horn.

Further, the light source can be a red-green-blue (RGB) light emitting diode (LED) configured to provide illumination in a plurality of colors. Thus, the LED can change colors while providing illumination. Moreover, the LED is triggered to provide illumination in response to a beginning of sound emitted by the bike horn. In an example, the LED provides illumination while the bike horn emits sound. Accordingly, the LED can provide illumination for a predetermined period of time in response to the beginning of sound emitted by the bike horn. Furthermore, the LED can provide illumination for a predetermined period of time after the bike horn emits sound.

Additionally, the light source and sound sensor are powered by coin batteries. The batteries, light source, and sound sensor can be secured to a back side of the ring. Accordingly, the back side of the ring can include a bay configured to receive the batteries, light source, and sound sensor. Moreover, the batteries, light source, and sound sensor can be secured between the bay and a cover. The cover can be secured to the bay via a pair of screws or via a snap clip assembly. Furthermore, a clamp attached to the bike horn can secure the illuminated bike horn to handlebar.

In another embodiment, a vehicle includes at least two wheels and a handlebar. The vehicle can include a bike horn attached to the handlebar, the bike horn having a light source and a sound sensor. Further, the light source provides illumination in response to the bike horn emitting sound. Furthermore, the light source is a red-green-blue (RGB) light emitting diode (LED) that provides illumination in a plurality of colors based on the duration and intensity of sound emitted from the bike horn. Further still, the light source and sound sensor are attached to a power source that further comprises two coin batteries. Additionally, the bike horn further includes a ring that is attachable to a mouth of the bike horn and is configured to receive the light source, sound sensor, and power source.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1A:
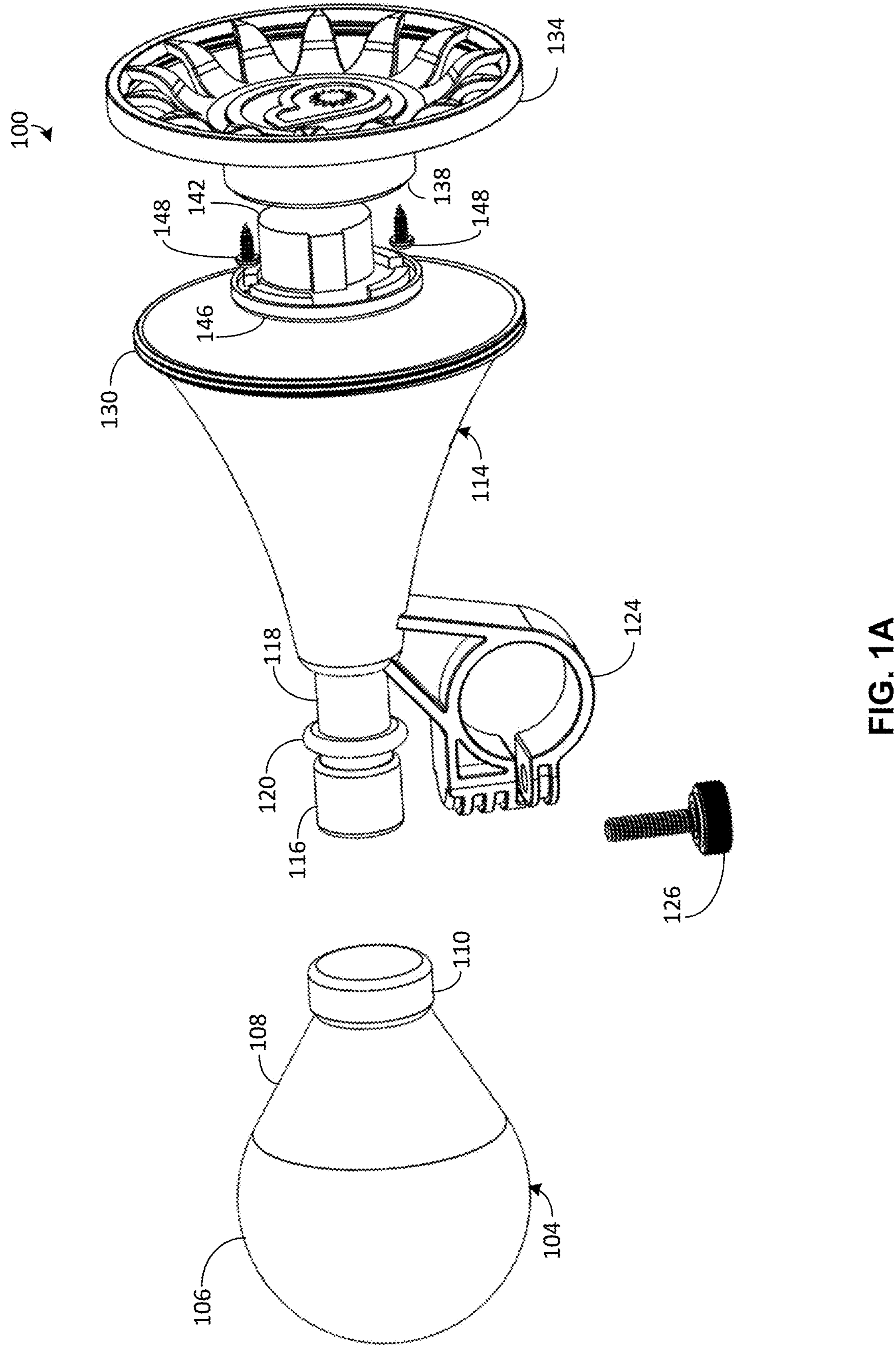
FIG. 1A is an exploded side view of an example illuminated bike horn.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure are related generally to an illuminated horn and, more particularly, to a bike horn with sound-activated illumination. Specifically, the illuminated bike horn of the present disclosure includes at least a bell, a diaphragm, and a clamp. Therefore, the illuminated bike horn can be attached to a bicycle and emits sound from the bell in response to user interaction (e.g., squeezing, "squishing") the diaphragm. Moreover, the illuminated bike horn is equipped with a sound-activated light. Thus, the bike horn can provide illumination in response to the bell emitting sound. The sound-activated light can include at least one light source, such as a light emitting diode (LED), that is electrically coupled to a sound sensor. In response to detecting sound, the sound sensor can allow electricity to flow to the light source, which responsively provides illumination to the illuminated bike horn and surrounding area. Accordingly, the illuminated bike horn can emit both sound and light, thereby providing enhanced safety during evening hours of low visibility. Because the light source is sound-activated, a single user interaction with the illuminated bike horn causes the bike horn to emit both sound and light, which enhances safety of the cyclist by obviating the need to operate distinct devices for sound and light.

FIG. 1A illustrates an exploded view of an example illuminated bike horn 100. In this example, the illuminated bike horn 100 includes a diaphragm 104. The diaphragm 104 can be a flexible membrane that vibrates to generate sound. Specifically, the diaphragm 104 can be made from a flexible material such as plastic, silicone, rubber, or treated fabric. As illustrated, the diaphragm 104 can have a bulbous shape, having a spherical end 106 and conical end 108. Because the diaphragm 104 has a bulbous shape and is made of a flexible material, the diaphragm 104 can be squeezed and return to the bulbous shape, thereby vibrating to generate sound. Specifically, the diaphragm 104 can be compressed to generate a sound (e.g., noise). Moreover, the conical end 108 of the diaphragm can have a diaphragm fastener 110 that is configured to couple the diaphragm 104 to a bell 114. Specifically, the bell 114 can include a horn fastener 116 that is configured to couple to the diaphragm fastener 110, such that the fasteners 110, 116 transmit vibrations and sound generated by the diaphragm to the bell 114. In the illustrated examples, the diaphragm fastener 110 is a female connection and the horn fastener 116 is a male connection. In other examples, alternative mating characteristics can be employed between the fasteners 110, 116. Additionally, further examples can include a different mechanism for providing mechanical vibrations or sound to the bell 114, such as a clapper or strike mechanism, electromagnetic actuator, piezoelectric transducer, spring mechanism, and a mechanical buzzer.

The bell 114 of the illuminated bike horn 100 has a conical shape and can be made of an ABS, plastic, metal, composite, or wood. At an apex of the bell 114 can be a throat 118 that couples the bell 114 to the horn fastener 116. The throat 118 can guide sound waves from the diaphragm 104 to the bell 114, facilitating more efficient sound transmission and amplification. Moreover, the throat 118 can be circumscribed by a circlip 120, which can be a retaining ring. In this example, the horn fastener 116 is a male end, such that the circlip ensures a flush connection between the diaphragm 104 and bell 114 by preventing the throat 118 from extending too far into the diaphragm 104. The illuminated bike horn 100 can further include a clamp 124 that is configured to attach the illuminated bike horn 100 to a bicycle. Accordingly, the clamp 124 can be a "c-clamp" that can circumscribe a handle bar or similar structure of the bicycle. More specifically, the clamp 124 can be configured to couple the illuminated bike horn 100 to human-powered vehicles such as bicycles (e.g., two wheels) and tricycles (e.g., three wheels), as well as motorized vehicles such as motorcycles. The clamp 124 can be fixably attached to the bell 114 and adjusted with a bolt 126, which can be a thumbscrew.

The bell 114 can have a mouth 130 at an end of the bell 114 opposite the throat 118 or vertex. The bell 114 can further flare from the throat 118 to the mouth 130, such that a circumference of the bell 114 changes between the throat 118 and the mouth 130. In some examples, the flare can be linear such that the circumference of the bell 114 gradually increases at a constant rate towards the mouth 130. In this example, the flare of the bell 114 is exponential, such that the circumference of the bell 114 increases exponentially towards the mouth 130, which provides improved sound dispersion at the mouth 130 compared to a linear flare. In other examples, the bell 114 may include no flare, such that the bell 114 has a cylindrical shape having uniform circumference extending from the throat 118 to the mouth 130.

The mouth 130 of the bell 114 can be threaded to receive a ring 134 having a matching thread. In other examples, the ring 134 can snap onto the mouth 130. The ring 134 can support internal components of the illuminated bike horn 100, which will be further discussed. One of the interior components can be a sound-activated light source, which illuminates in response to the illuminated bike horn 100 generating sound. Accordingly, the ring 134 can be configured to allow sound and light to pass through the ring 134. In this example, the ring 134 has a hub-and-spoke design, such that sound and light can pass through space between spokes of ring 134. In further examples, the ring 134 can be made from an optically and acoustically transparent material, such that the ring 134 does not block a substantial light and sound. Examples of optically and acoustically transparent materials are ABS, acrylic, fiberglass, and polycarbonate (plastic).

Furthermore, the internal components of the illuminated bike horn 100 can be positioned between on the ring 134. Specifically, the internal components can be positioned between the ring 134 and the bell 114. More specifically, the ring 134 can include a bay 138 that receives and secures other internal components of the illuminated bike horn 100, such as a housing 142. The housing 142 can enclose electrical components that include as a light source, power source, sound sensor. In some examples, the housing 142 is illustrative of electrical components that are not shown in FIG. 1A for purposes of simplification of explanation. The housing 142 can be received by the bay 138 of the ring 134 and secured by a cover 146. More specifically, the cover 146 can be secured to the bay 138 by fasteners, such as a pair of screws 148. The cover 146 can be made of a material similar to the ring 134 and bell 114, such as an ABS.

Figure 1B:
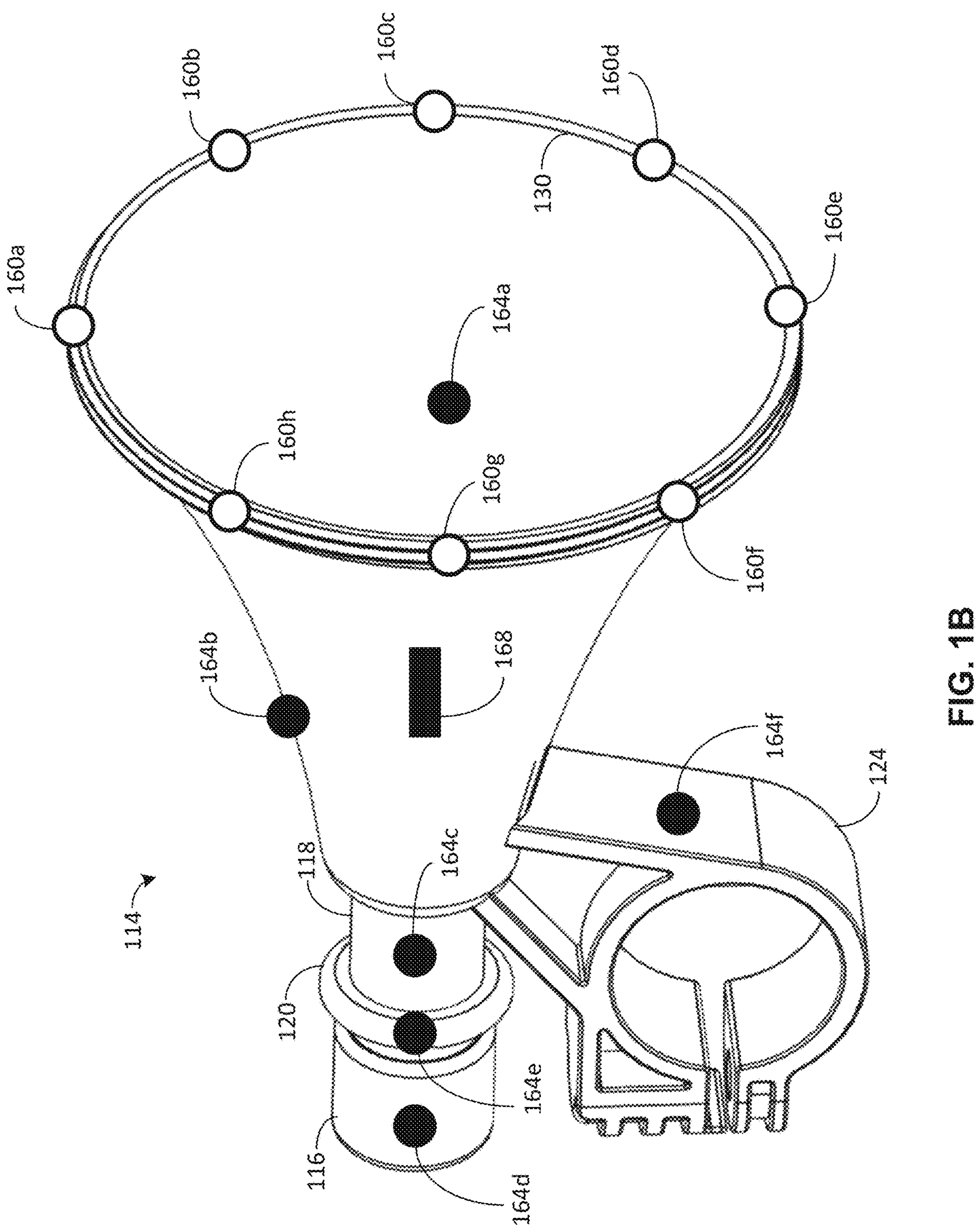
FIG. 1B is an exploded diametric view of an example bell of the illuminated bike horn.

FIG. 1B illustrates a diametric view of an example bell 114 of the illuminated bike horn 100. The bell 114 of FIG. 1B can include similar components to the bell 114 of FIG. 1A, such as a mouth 130, a throat 118, a horn fastener 116, a circlip 120, and a clamp 124. In contrast to the bell 114 of FIG. 1A, the bell 114 of FIG. 1B can be configured to receive a housing 142 or electrical components (e.g., a sound sensor and light source) without the ring 134 of FIG. 1A. Specifically, the illuminated bike horn 100 is not limited to a ring 134 that is configured to screw onto a threaded mouth of the bell 114. Rather, another mounting device made of materials similar to the ring 134 can be attached to the mouth 130 of the bell 114. Further, the mounting device can include a bay 138 and components such as the cover 146 and screws to secure the housing 142 or electrical components similar to the ring 134. The mounting device can couple to the bell 114 in various configurations, which are explained with references to the bell 114. Accordingly, the mounting device is not illustrated in FIG. 1B for purposes of simplification of explanation. However, the ring 134 can be an example of a mounting device.

Rather than attaching a ring 134 along the entire circumference of the mouth 130, a mounting device can couple to the mouth 130 at specific mount locations 160. That is, the mounting device can couple to the bell 114 at discrete points along the circumference of the mouth 130, the discrete points being specific mount locations 160. The mounting device can couple to the mouth 130 at mount locations 160 via snap fits, clamps, brackets with screws, lip hooks, magnetic fasteners, adhesive, tension fasteners, spring clips, or bolt and nut combinations. In an example, the mounting device can couple to the bell 114 at each of the mounting locations 160 illustrated as white circles.

In other examples, the mounting device can couple to more or less than the mounting locations 160 illustrated. For example, the mounting device can couple to the bell 114 at less than the eight mounting locations 160 illustrated. Specifically, the mounting device can couple to the mouth 130 at a first mount location 160*a*, a fourth mount location 160*d*, and a sixth mount location 160*f*. That is, the mounting device can be in the shape of a three point star, coupling to the mouth 130 of the bell 114 at mount locations 160 corresponding to points of the star shaped mounting device. Accordingly, a three point mounting device can be rotated to couple to other mount locations 160 along the circumference of the mouth 130. For example, the three point mounting device can be rotated to couple to the second mount location 160*b*, fifth mount location 160*e*, and eighth mount location 160*h*. Moreover, the mount locations 160 are provided for illustrative purposes, such that the mounting device can couple to any three different points along the continuous circumference of the mouth 130.

Additionally, the mounting device can be in the shape of a five pointed star, such that the mounting device couples to the bell 114 at five of the mounting locations. Accordingly, a mounting device can couple to the mouth 130 at any N number of mounting locations 160 along mouth 130, N being an integer greater than zero. In another example, the mounting device can be a bar, such that the mounting device couples to mount locations 160. That is, the mounting device can couple to the mouth 130 at a third mount location 160*c* and a seventh mount location 160*g*. In further examples, the mount device can couple to the mouth 130 at only one mount location 160. While the ring 134 can couple to the entire circumference of the mouth 130, a similar mounting device can couple to discrete mount locations 160 along the circumference of the mouth 130.

Furthermore, a ring 134 that has a hub-and-spoke design can be adjusted to have spokes that correspond to a discrete number of mount locations 160 to form, for example, a three or five pointed star. As illustrated in FIG. 1A and as will be discussed further below, the bay 138 can be positioned at the center of a backside of the ring 134. Accordingly, the ring 134 or similarly situated mounting device can allow sound to travel from the throat 118 to the mouth 130 and exit the bell 114 around the circumference of the bell 114 or mouth 130. More specifically, a hub-and-spoke design, as well as a pointed star, can have openings between spokes or points near the circumference of the mouth 130 that provide pathways for sound and light. In one example, a mounting device can be selected to cover a specific percentage of the area defined by the circumference of the mouth 130. For example, a four pointed star mounting device that couples to the first, third, fifth, and seventh mounting locations 160*a, c,e,g* can cover approximately 50% of the area defined by the circumference of the mouth 130. Therefore, the example four pointed star mounting device can block 50% of the sound emitted by the illuminated bike horn 100.

In another example, a three pointed star as described can be employed to block 30% of the sound emitted, whereas a five pointed star as described can be employed to block 70% of the sound emitted. In further examples, the width and density of points or spokes of the mounting devices can be altered to further increase or decrease an amount of area between the circumference of the mouth 130 that is blocked by the mounting device. That is, the mounting device or ring 134 can be selected to have points or spokes that cover a percentage of the area between the circumference of the mouth 130 between 5-95%. Moreover, the bay 138 can be positioned on the mounting device or ring 134 at a position that is off center. That is, the mounting device or ring 134 is not limited to a ring 134, star, or bar shape. Additionally, or alternatively, a mounting device or ring 134 can allow sound and light to travel through the center of the mouth 130 and block sound at the circumference of the mouth 130. Moreover, the mounting device or ring 134 can have a structure that is a combination of shapes and lines to block sound and/or light at various positions relative to the mouth 130.

Similar to the ring 134, a mounting device is configured to couple electrical components, such as a light source and sound sensor, to the bell 114 of the illuminated bike horn 100. However, the electrical components can be attached at various positions 164 along the bell 114. Specifically, the electrical components, or in some examples a housing 142 encompassing the electrical components, can be attached to the illuminated bike horn 100 at one or more positions 164 via snap fits, clamps, brackets with screws, lip hooks, magnetic fasteners, adhesive, tension fasteners, spring clips, or bolt and nut combinations. Moreover, the electrical components can be directly attached to a position 164 that is on the bell 114 or illuminated bike horn 100 component, such that an additional mounting device or ring 134 is unnecessary. For example, the electrical components can be directly attached to a first position 164*a*, which is at an interior position of the bell 114.

In another example, the electrical components can be attached at a second position 164*b* at the exterior of the bell 114. In yet another example, the electrical components can be at a third position 164*c*, which is at the throat 118 attached to the bell 114. Although the third position 164*c* is illustrated on an external surface of the throat 118, the third position 164*c* and therefore electrical components can be within the throat 118. Moreover, the electrical components can be attached at a fourth position 164*d* corresponding to the horn fastener 116. Similar to the third position 164*c*, the fourth position 164*d* and therefore electrical components can be positioned within the horn fastener 116. In other examples, the electrical components can be attached at a fifth position 164*e* at the circlip 120 or a sixth position 164*f* at the clamp 124.

In further examples, the electrical components can be integrated with the bell 114. For example, the bell 114 can include a slot 168 that is configured to receive the electrical components. Furthermore, the electrical components can be integrated with individual components such as the horn fastener 116, the circlip 120, throat 118, or clamp 124.

Specifically, each of the electrical components, such as a light source, a sound sensor, and power source can be integrated with a single one of aforementioned components. Similarly, each of the electrical components can be attached at a single position 164.

Alternatively, one or more of the electrical components can be at distinct positions 164. For example, a sound sensor can be at the first position 164, a light source can be at the second position 164*b*, and a power source can be at third position 164*c*. Accordingly, weight and functionality of the electrical components can be dispersed along a surface or body of the bell 114 or illuminated bike horn 100. In this example, the sound sensor is at the first position 164*a* within the bell 114 to receive a greater amount of sound compared to the rest of illuminated bike horn 100, whereas, the light source is at a second position 164*b* on an external surface of the bell 114 to disperse a greatest amount of light relative to other positions of the illuminated bike horn 100. Moreover, the power source is at the third position 164*c*, which can be within the throat 118, for enhanced protection from external elements compared to other positions 164.

In another example, the sound sensor and light source can be together at one of the positions 164, such as the first position 164*a*. Alternatively, the sound sensor and light source can be coupled to a mounting device or ring 134. In this example, the power source can be at different location from the sound sensor and light source at the first position 164*a*. For example, the power source can be at a fifth position 164*e*. Here, the mounting device or first position 164*a* may not be able to support weight associated with the power source, such as a battery. Accordingly, the power source can be placed at the fifth position 164*e*, which can be a clamp capable of holding a power source with a weight that and size that is too large for the first position 164*a*. Moreover, the power source can be an external battery or power supply. Therefore, the power supply is not attached or coupled directly to the bell 114, such as at a position 164. Rather, the power supply can have a wired connection to the electrical components that is received at a position 164, such as the fifth position 164*e*. In additional examples, one or all of the electrical components can be positioned on or within the diaphragm 104 of the illuminated bike horn 100.

Figures 2A, 2B:
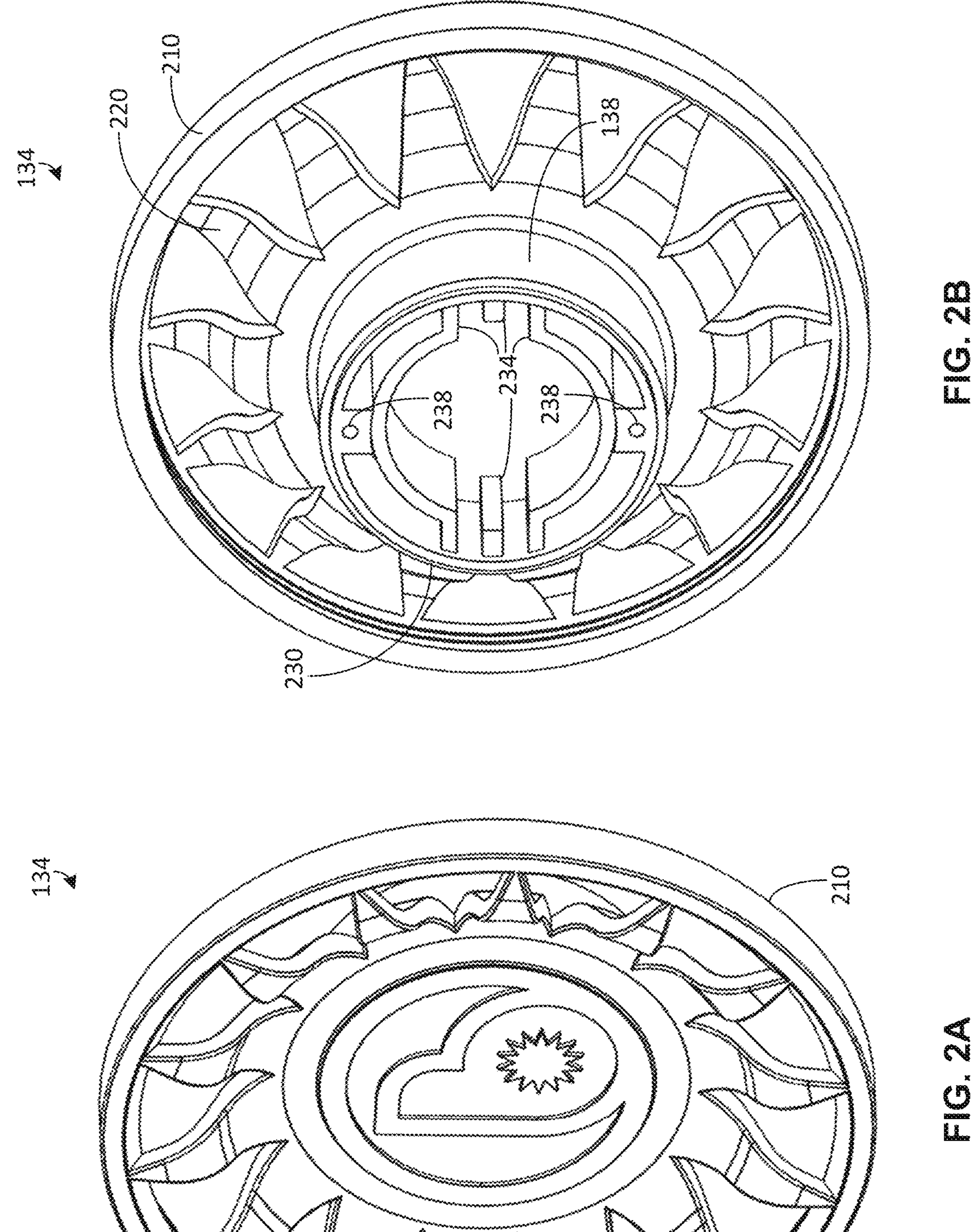
FIGS. 2A-B are example views of a ring of the illuminated bike horn.

FIGS. 2A-B illustrate views of the ring 134 of the illuminated bike horn 100 of FIG. 1A. Specifically, FIG. 2A illustrates a front side of the ring 134 and FIG. 2B illustrates a back side of the ring 134. As illustrated, the ring 134 can have an outer diameter 210 and a concave body 220. That is, the body 220 of the ring 134 can extend into a corresponding bell 114, whereas the outer diameter 210 is configured to couple the mouth 130 of a bell 114. FIG. 2B illustrates the back side of the ring 134, which includes the bay 138. The bay 138 can have a circumference 230 and extend from the back side of the ring 134. As illustrated in FIG. 2B, the bay 138 can also have a plurality of support structures 234 that extend from the back side of the ring 134. The support structures 234 are shaped to receive the housing 142 and provide a flush fitting between the housing 142 and the bay 138. For example, the circumference 230 and support structures 234 of the bay 138 can extend a distance from the ring 134 that is at least a length corresponding to the housing 142. The support structures 234 can make contact with a received housing 142, such that the housing 142 is laterally secured by the support structures 234. Furthermore, the bay 138 can include tapped holes 238 for receiving the fasteners, such as the pair of screws 148. Specifically, the housing 142 can be received by the bay 138 and can be secured by a cover 146 via the screws 148, such that the housing is fixed between the bay 138 and the cover 146.

Figures 3A, 3B:
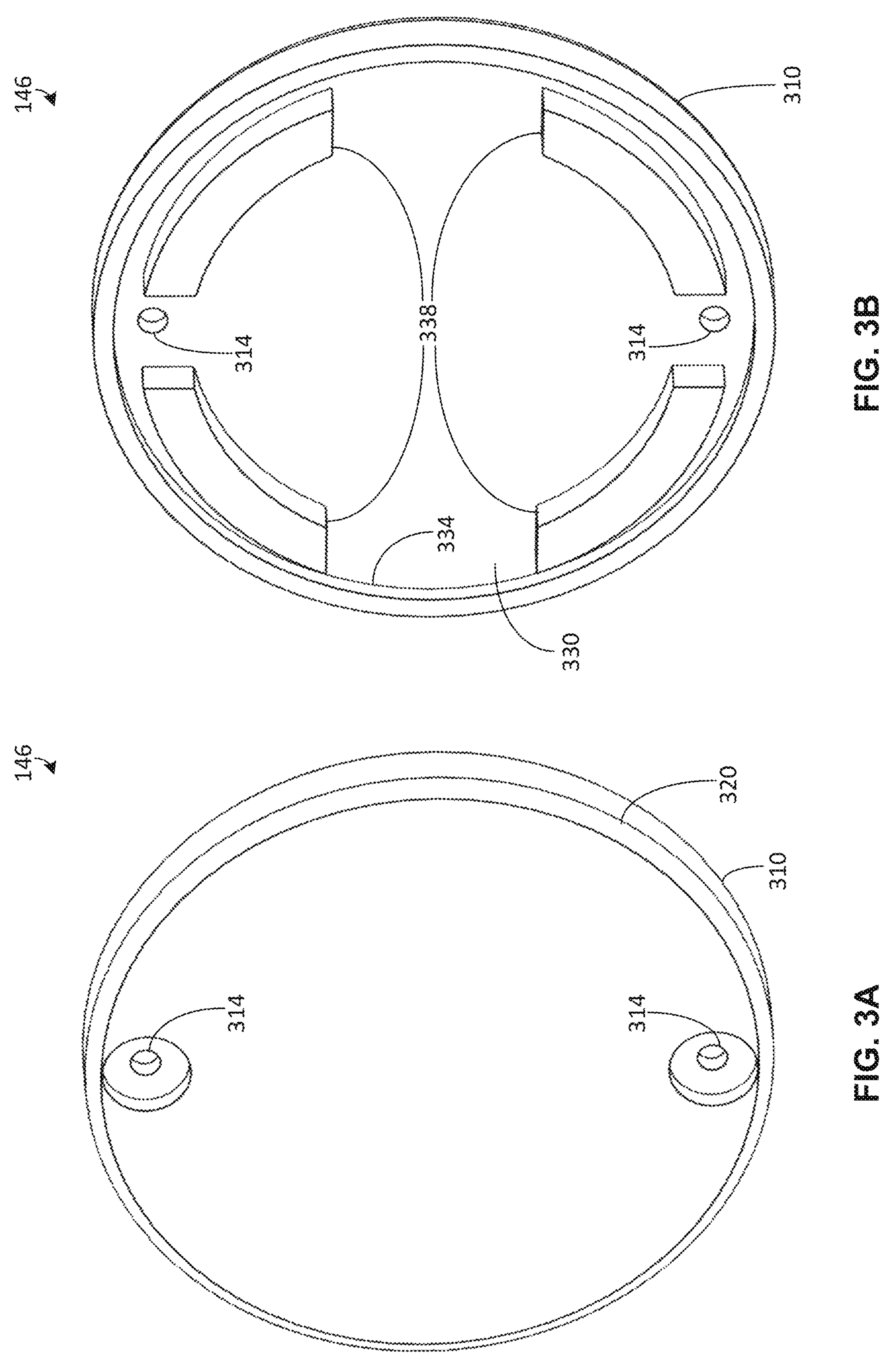
FIGS. 3A-B are example views of a cover of the illuminated bike horn.

FIGS. 3A-3B illustrate an example cover 146 of the illuminated bike bell 114. The cover 146 can have an external diameter 310 that is substantially equal to the circumference 230 of the bay 138. Additionally, the cover 146 can have a pair of through holes 314 that allow a pair of screws 148 to travel through and fasten the cover 146. FIG. 3A illustrates a top side of the cover 146, which would face the bell 114 and away from the ring 134 when assembled. The external diameter 310 of the cover 146 can have a chamfer 320 on the top side of the cover 146, which can provide a flush fit between the cover 146 and the bay 138. Moreover, the through holes 314 can also be counter bored on the top side of the cover 146 to provide a flush fit between the screws 148 and the cover 146.

FIG. 3B illustrates a back side of the cover 146, which can have a recessed surface 330 within an outer radius 334 of the cover 146. Additionally, the cover 146 can have locking structures 338, which can extend from the recessed surface 330. The locking structures 338 can extend in a manner that is complementary to the support structures 234 of the bay 138. For example, the locking structures 338 can extend between the support structures 234 and the circumference 230 of the bay 138. Therefore, the support structures 234 and locking structures 338 can be interleaved to prevent later movement of the cover 146 in an assembled illuminated bike horn 100. Because the housing 142 is between the cover 146 and ring 134 in an assembled illuminated bike horn 100, the cover 146 can prevent vertical movement of the housing 142 relative to a plane parallel to the bay 138. Additionally, the locking structures 338 can be received by the bay 138 between the support structures 234 and circumference 230 of the bay 138. Therefore, the locking structures 338 can protect the housing 142 from external elements, such as rain.

Figure 4:
FIG. 4 is an example of an electrical system of the illuminated bike horn.
Figure 4:
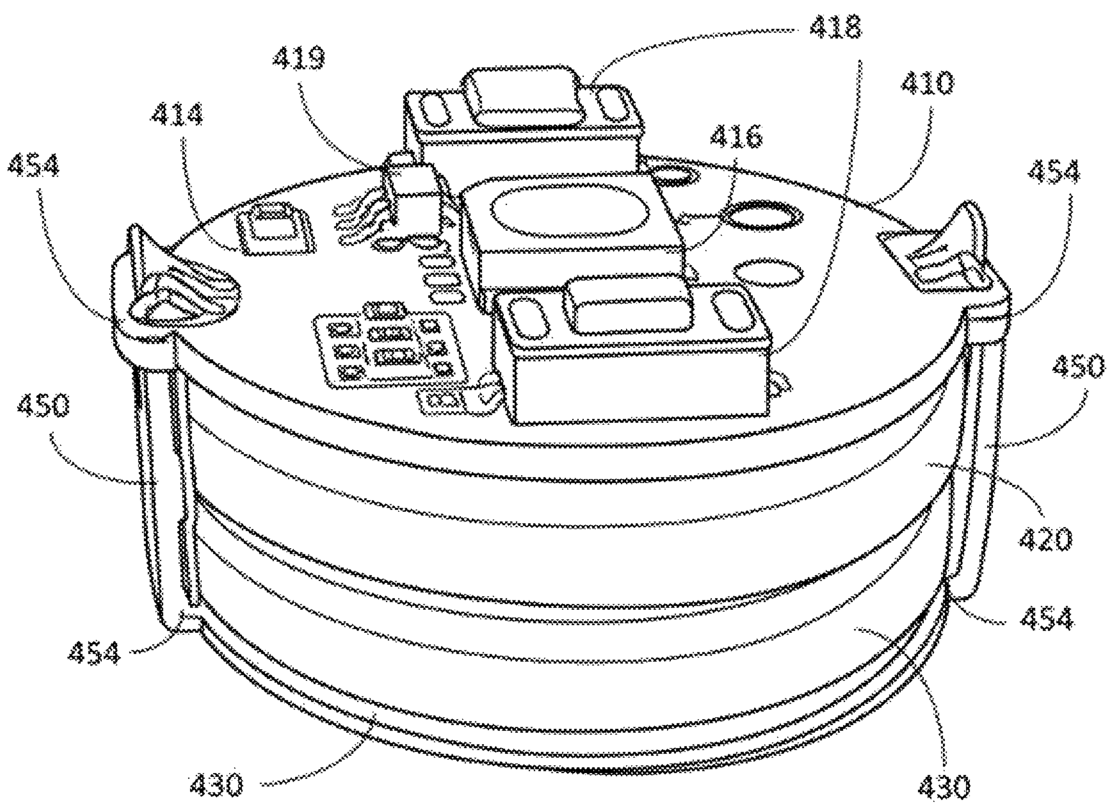

FIG. 4 illustrates a compact electrical system 400 of the illuminated bike horn 100. Specifically, the electrical system 400 can be internal components encompassed by the housing 142. The compact electrical system 400 can include a first layer 410, which can be made from a printed circuit board (PCB) substrate. Accordingly, the first layer 410 can have a first side 414 that has one or more components mounted to the surface of the first side 414. For example, one or more light sources 416 can be surface mounted to the surface of the first side 414, including a light emitting diode (LED). Other components can also be surface mounted to the first side 414, including one or more transducers 418. Specifically, the LED can be a red-green-blue (RGB) LED and the transducers 418 can be sound sensors. FIG. 4 illustrates an example compact electrical system 400 that includes more than one transducer 418.

In an example, the light source 416 can emit light to provide illumination to one or both of a horn (e.g., bell 114 of FIGS. 1A-1B) and an area proximal to the horn. The light source 416 can be triggered to provide illumination in response to a beginning of sound emitted by the illuminated bike horn 100, such that the light source can be immediately response to sound. That is, the sound emitted by bike horn 100 can have a time duration, such that light source 416 can continue to provide illumination as the horn emits sound. Specifically, the duration of time that the light source 416 provides illumination can be substantially equal to a duration of time that the bike horn 100 emits sound. In other examples, the light source 416 can continue to provide illumination for a predetermined amount of time after the bike horn 100 emits sound sensed by the transducer 418. Moreover, the light source 416 can continue to provide illumination for the predetermined amount of time after the bike horn 100 emits sound in response to detecting the beginning of a sound emitted by the bike horn 100. That is, the electrical system 400 can be configured to activate the light source 416 for thirty seconds after sensing sound by the transducer, such as by employing a timing unit 419. Furthermore, because the light source 416 can be an LED, the light source 416 can change colors during the duration of time that the light source 416 provides illumination. Further still, the brightness, duration, and color of the illumination provided by the light source 416 can be a function of the duration and intensity of the sound emitted by the horn and sensed by the transducer 418.

The first layer 410 of the compact electrical system 400 can have a second side (not illustrated) that can have an electrical contact to electrically couple to a second layer 420. The second layer 420 can be a battery, such as a CR2032 lithium coin battery. A third layer 430 can be electrically coupled to the second layer 420, and the third layer 430 can be another battery similar to the second layer 420. Accordingly, the second and third layers 420, 430 can be coupled in series and serve the compact electrical system 400 as a power source. In other examples, the second and third layers 420, 430 can be replaced by other types of power sources, such as other battery types (e.g., AAA, AA, 9 Volt), capacitors, rechargeable batteries, and can also be a wired connection to an external power supply. A fourth layer 440 can be electrically coupled to another side of the third layer 430, as well as provide support to the second and third layers 420, 430. That is, the second and third layers 420,430 can be fixed between the first and fourth layers 410, 440 and secured by posts 450. The posts 450 can also complete an electrical connection between the first and fourth layers 410, 440. Specifically, one or both of the posts can provide a power (or ground) connection from an electrical contact at the fourth layer 440 to an electrical contact at the first layer 410.

Because in some examples the compact electrical system 400 of FIG. 4 can be enclosed by a housing 142, the each of the layers of the electrical system 400 have a similar diameter, except for extents 454 of the first and fourth layers 410, 440 that protrude to receive the posts 450. That is, the example electrical system 400 can have the same shape as the housing 142. Therefore, the example electrical system 400 can be received by the bay 138 without a housing 142 and secured by the cover 146 similar to the housing 142.

Figure 5A:
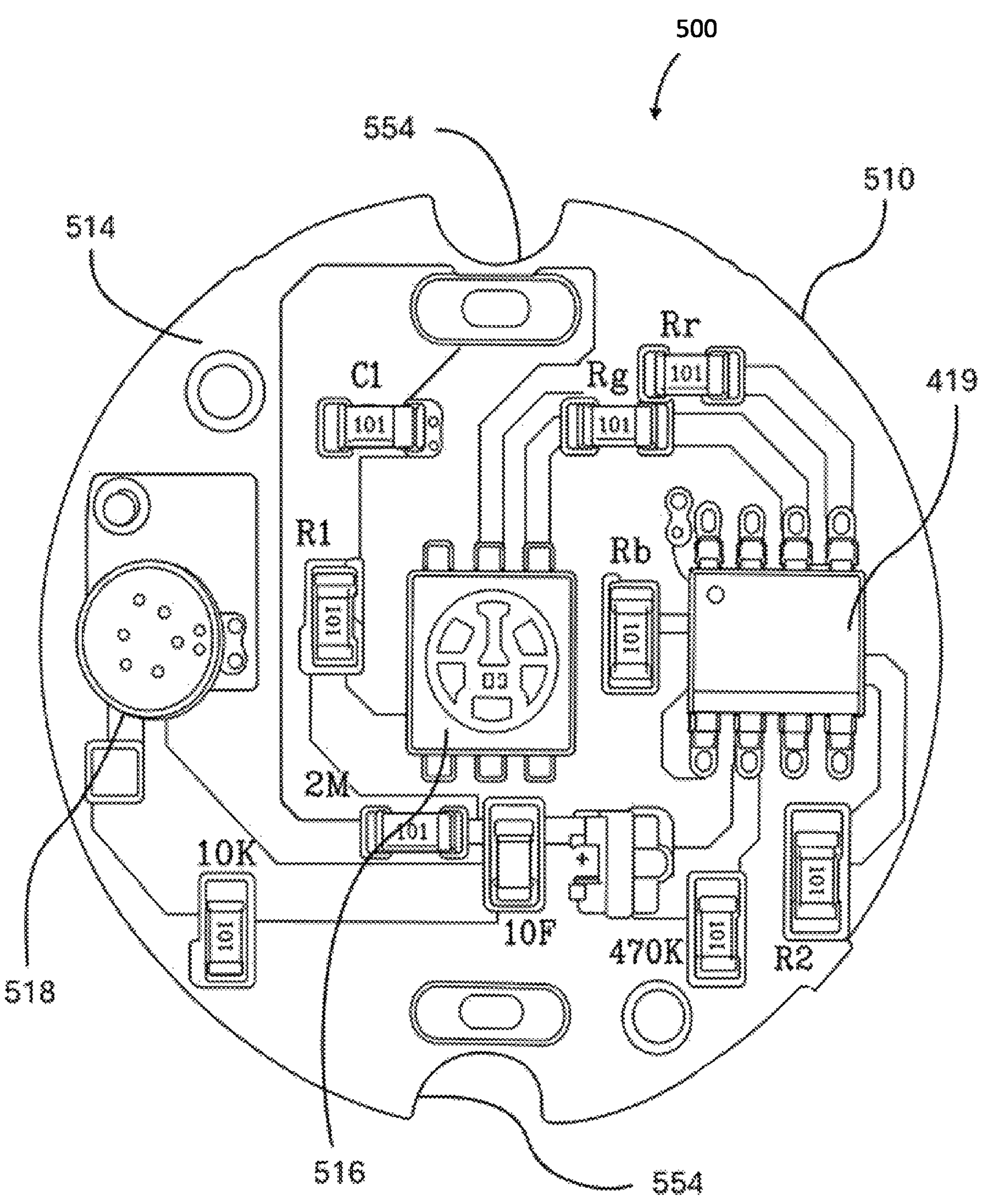
FIGS. 5A-5C show an example of another electrical system of the illuminated bike horn.
Figure 5B:
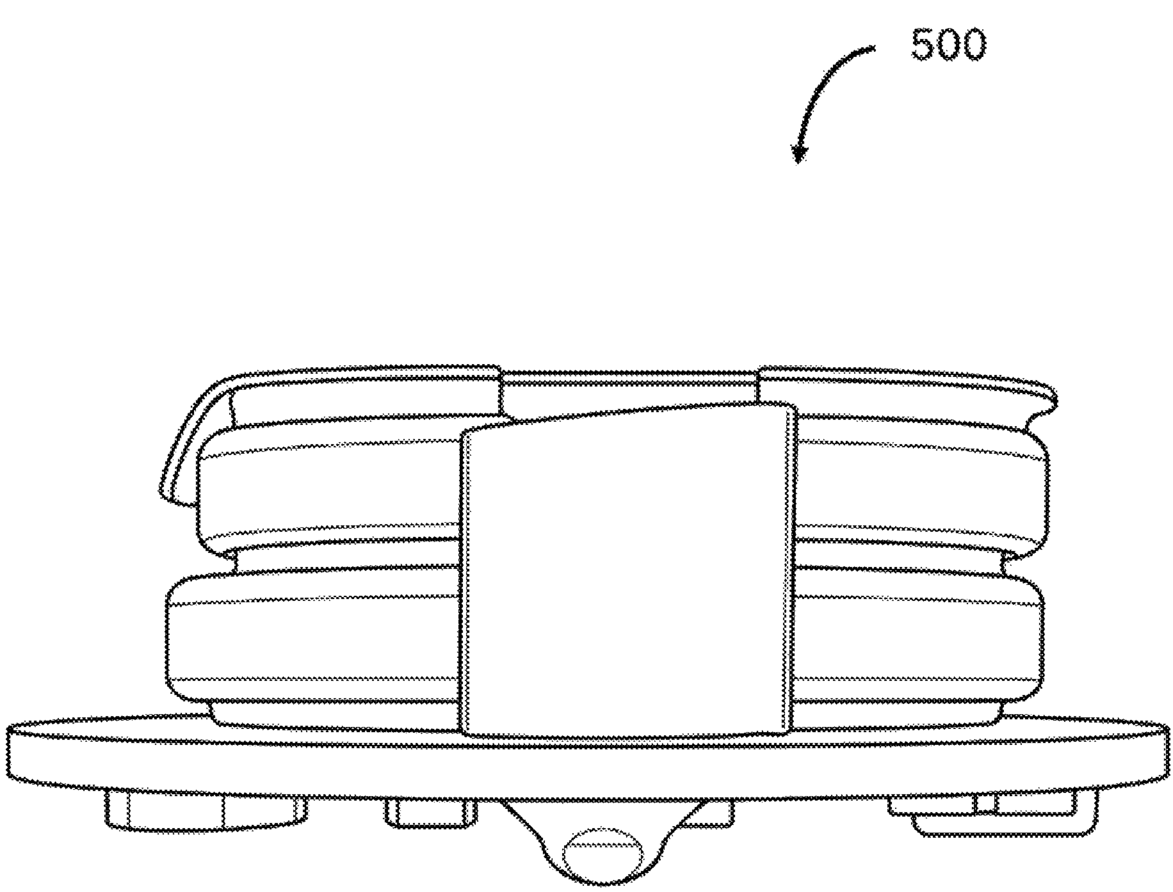
Figure 5C:
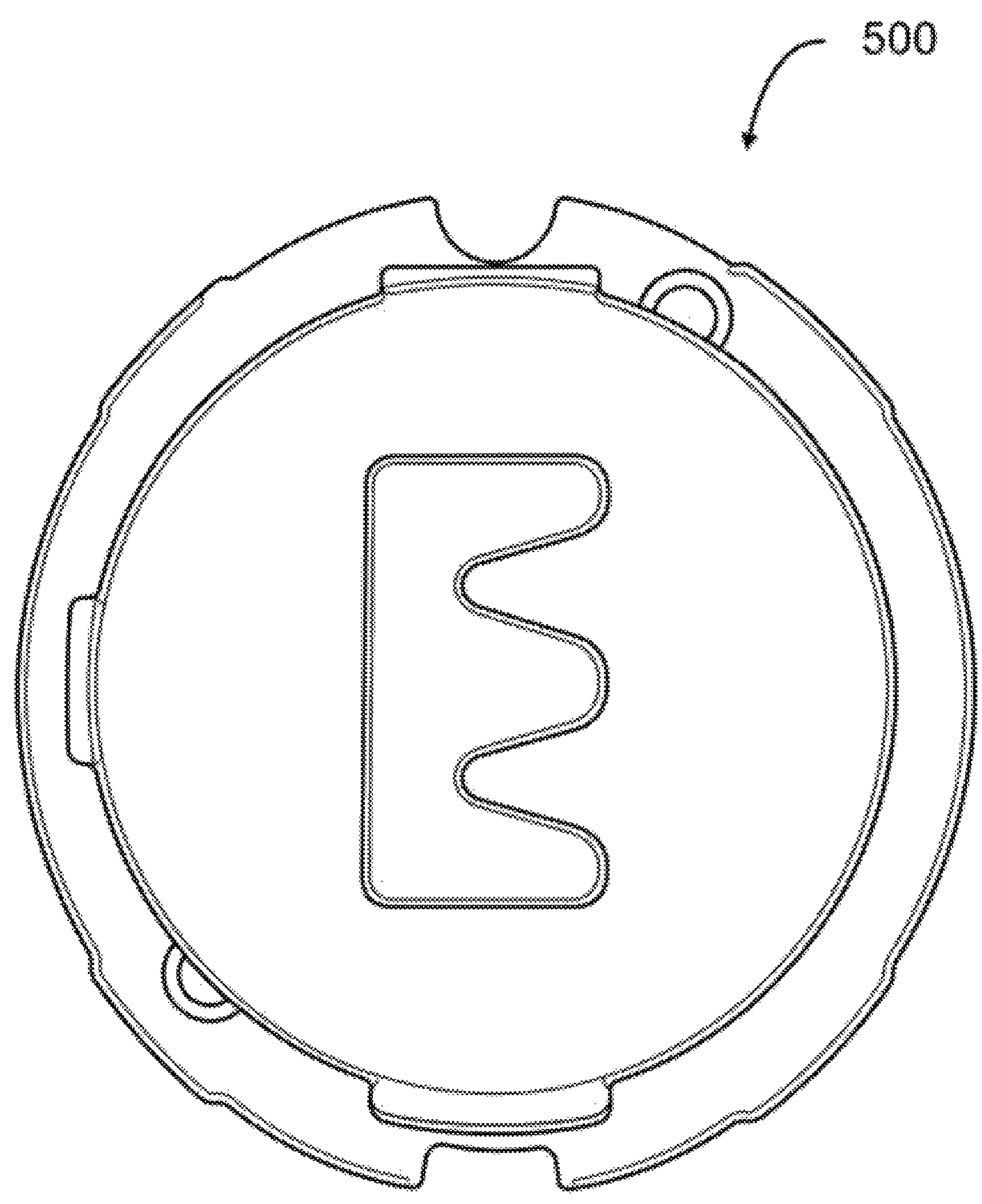

FIG. 5A illustrates a top view of an example mountable electrical system 500, which can include the same components such as the electrical system 400, such as a light source 416 and a transducer 418. FIGS. 5B and 5C illustrate side and bottom views, respectively, of the example mountable electrical system 500. Specifically, FIG. 5A illustrates a first layer 510 of the mountable electrical system 500 having a first side 514, which further include one more light sources 516 and transducers 518 mounted to the first side 514. Accordingly, the first layer 510 and first side 514 can correspond to the first layer 410 and first side 414 of FIG. 4. Moreover, the example mountable electrical system of FIG. 5A can have a second and third layer that are batteries, corresponding to the compact electrical system of FIG. 4, as well as a fourth layer and posts. Rather, the example electrical system 500 can have a first layer 510 and a fourth layer (not illustrated in FIG. 5A) that have a diameter greater than diameters of the first and fourth layers 410, 440 of the compact electrical system 400 of FIG. 4. Accordingly, the first layer 510 and fourth layer of the mountable electrical system 500 can also be greater than the diameters of the second and third layers (e.g., second and third layers 420, 430 of FIG. 4).

Rather than extents 454 of the compact electrical system 400, the mountable electrical system includes a pair of notches 554. These notches 554 can be positioned to allow a fastener or screws 148 to travel between first layer 510 and fourth layers. Accordingly, the notches 554 can further secure and prevent lateral movement of the mountable electrical system 500. In some examples, the support structures 234 of the bay 138 can be removed, such that the circumference of the bay 138 can make contact with the mountable electrical system 500 or housing 142. Additionally, or alternatively, the locking structures 338 can make contact with mountable electronic system 500. In still other examples, the support structures 234 and locking structures 338 can be removed entirely.

Referring back to FIGS. 1-3B, the screws 148 can also be replaced by a snap-fit assembly. That is, the through holes 314 of the cover 146 can be replaced by hooks or tabs that extend in a tapered manner beyond the external diameter 310 of the cover 146. Accordingly, the circumference 230 of the bay 138 can have slots instead of tapped holes 238. Therefore, the hooks or tabs can engage the slots to provide secure fit that can withstand pulling forces and vibrations, as well as secure internal components, such as a housing 142, compact electrical system 400, or mountable electrical system 500. Moreover, a snap-fit assembly obviates the need for additional tools such as a screwdriver to replace batteries (e.g., second and third layers 420, 430 of FIG. 4). Additionally or alternatively, the cover 146 can be secured by at least two independent and simultaneous hand movements. For example, the cover 146 can secure the housing 142 and/or electrical system 400, 500 within the bay 138 via a push and turn mechanism, a safety latch, a press and lift mechanism, or a slide and screw mechanism.

Figure 6:
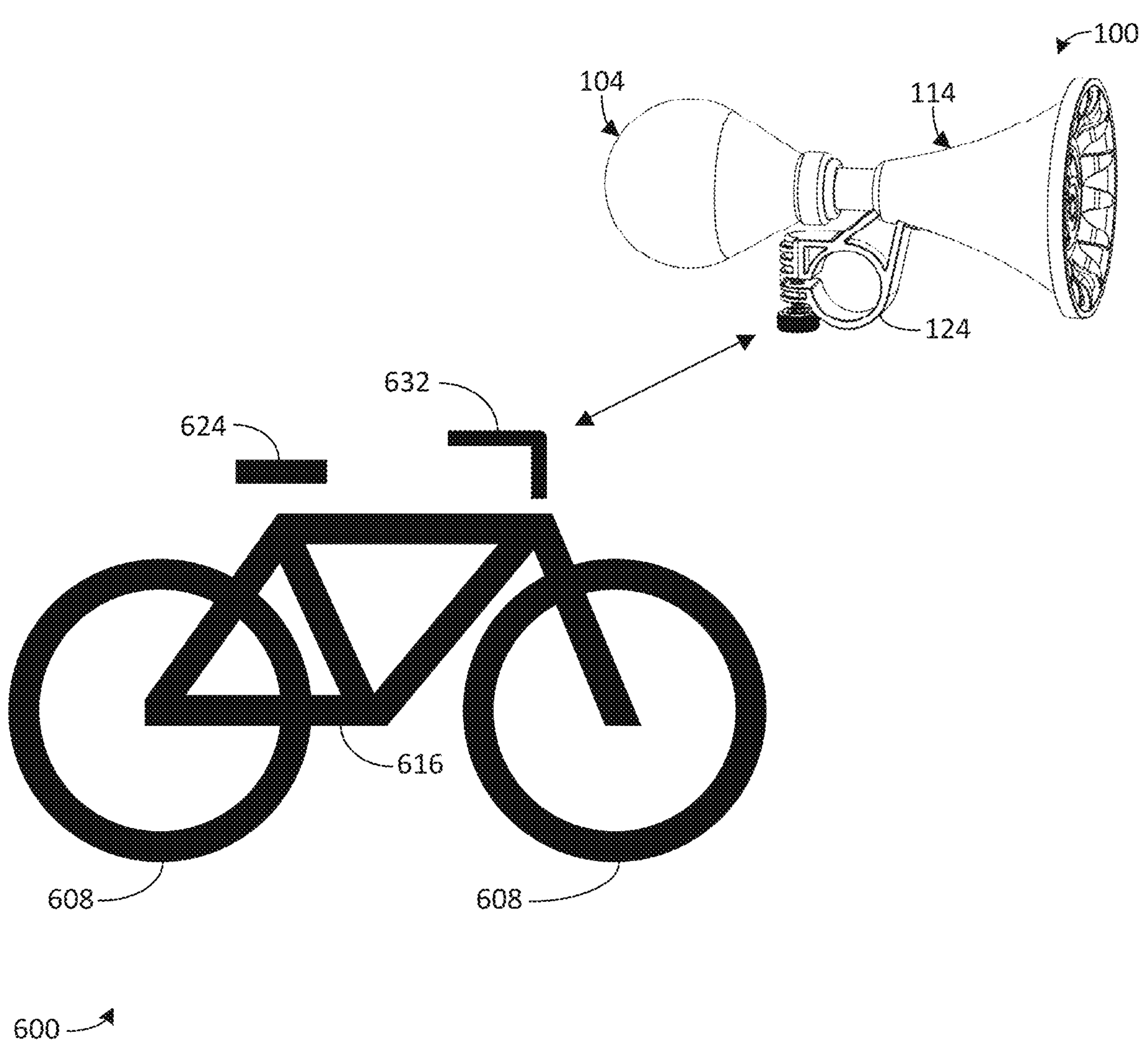
FIG. 6 is an example bicycle equipped with an illuminated bike horn.

FIG. 6 illustrates an example bicycle 600 that includes at least two wheels 608, a frame 616, a seat 624, and a handlebar 632. The illuminated bike horn 100 can be attached to the bicycle 600. More specifically, the illuminated bike horn 100 can be attached the handlebar 632 of the bicycle 600 via the clamp 124. In other examples, the illuminated bike horn 100 can be attached to the frame 616 of the bicycle 600. Moreover, the example bicycle 600 is illustrated as having two wheels 608. However, the illuminated bike horn 100 can be attached to any vehicle that has a frame or handlebar, such as a tricycle (e.g., three wheels), motorcycle, or four wheeled utility vehicle. Further, the illuminated bike horn 100 can also attach to any vehicle via a steering wheel, such as an automobile or golf cart. Furthermore, the illuminated bike horn 100 can be attached to a vehicle, such as the handlebar 616 of the bicycle 600, via a fastener other than the clamp 124. For example, the illuminated bike horn 100 can be attached to a handlebar 616 via adhesive, magnetic fasteners, screws, or bolts and nuts.

Figure 7:
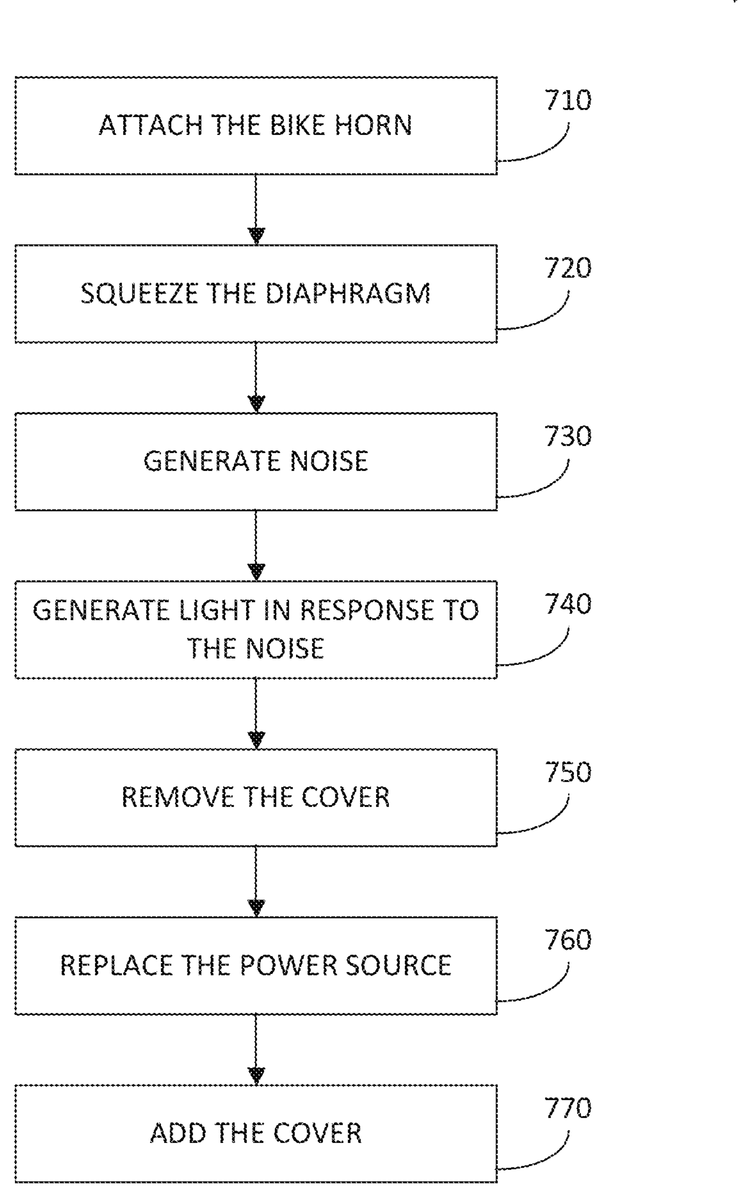
FIG. 7 is a flowchart of an example method for operating the illuminated bike horn.

In view of the structural and functional features described above, example methods will be better appreciated with reference to FIGS. 1-6. While, for purposes of simplicity of explanation, the example method of FIG. 7 are shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement the methods, and conversely, some actions may be performed that are omitted from the description.

FIG. 7 is an example of a method 700 for operating an illuminated bike horn 100. The method 700 can begin at 710 by attaching the illuminated bike horn to a bicycle 600, as described with respect to FIG. 6. At 720, the diaphragm 104 of the illuminated bike horn 100 can be squeezed or "squished" by a user. In response, at 730, the illuminated bike horn 100 can generate a sound or noise. At 740, the illuminated bike horn 100 can generate light in response to the noise generated at 730. Specifically, the illuminated bike horn 100 can include a sound sensor that senses noise generated at 730. Accordingly, in response to sensing the noise at 730, the illuminated bike horn can generate light at 740. Thus, light generated by illuminated bike horn at 740 can be performed according the examples provided with respect to FIG. 4, such as illumination over a predetermined amount of time in response to the sound sensor sensing noise at 730.

Moreover, at 750, the cover 146 can be removed by a user, as described with respect to at least FIGS. 3A-3B. Accordingly, at 760, the power source of electrical components enclosed by the cover 146 can be replaced. Further, at 770, the cover 146 can be added to enclose and protect the electrical components.

Figure 8:
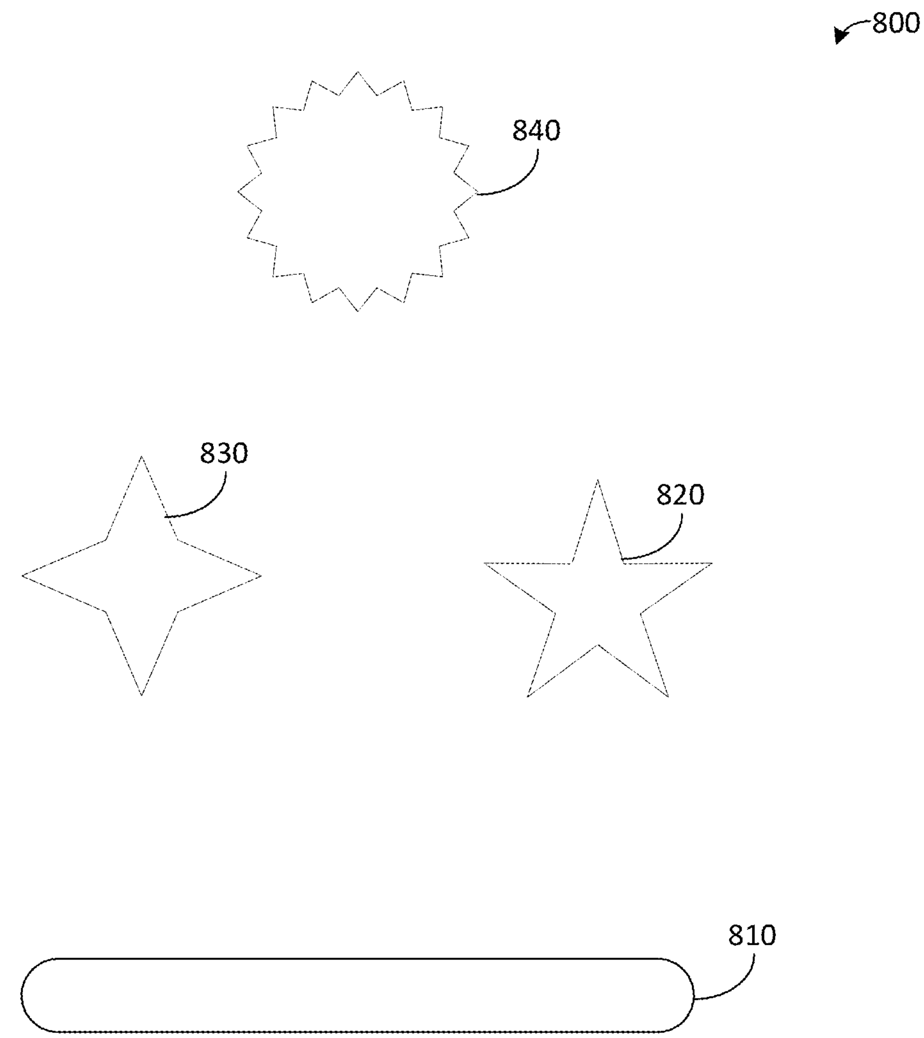
FIG. 8 illustrates example mounting devices of the illuminated bike horn.

FIG. 8 illustrates example mounting devices 800, which can be mounted to discrete mount locations 160 as described in FIG. 1B. Specifically, FIG. 8 illustrates example shapes of mounting devices 800 on a first side, the shapes having points that correspond to mount locations 160. For example, a bar mounting device 810 can have a length with two opposing ends. Each end of the bar mounting device 810 can be a point that attaches to a mounting location 160. A five pointed star mounting device 820 can include five points that each couple to a discrete mounting location 160. Similarly, a four pointed star mounting device 830 can have four points that each couple to a discrete mounting location 160. The number of points of mounting device 800 can be greater than or equal to one. Accordingly, a sixteen pointed star 840 can be mounted to a mouth 130 of a bell 114 and have sixteen points that each couple to a discrete mounting location 160 along the circumference of the mouth 130. Moreover, each of the mounting devices 800 can include a bay for receiving a housing 142 and/or electrical components.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. An illuminated bike horn comprising:

a ring configured to attach to a mouth of the bike horn continuously around a circumference of the mouth;

a power source, light source, and sound sensor secured to a back side of the ring, wherein the light source is operable to provide illumination in response to the bike horn emitting sound.

2. The illuminated bike horn of claim 1, wherein the bike horn emits sound in response to movement of a diaphragm coupled to a bell of the bike horn.

3. The illuminated bike horn of claim 2, wherein the light source is a red-green-blue (RGB) light emitting diode (LED) configured to provide illumination in a plurality of colors.

4. The illuminated bike horn of claim 3, wherein the LED is configured to change colors while providing illumination.

5. The illuminated bike horn of claim 1, wherein the sound sensor and light source are positioned between the mounting device and bike horn.

6. The illuminated bike horn of claim 1, wherein the back side of the ring comprises a bay configured to receive the power source, light source, and sound sensor.

7. The illuminated bike horn of claim 6, wherein power source, light source, and sound sensor are secured between the bay and a cover.

8. The illuminated bike horn of claim 7, wherein the cover is secured to the bay via a pair of screws.

9. The illuminated bike horn of claim 7, wherein the cover is secured to the bay via a snap clip assembly.

10. The illuminated bike horn of claim 7, wherein the cover is secured to the bay by a mechanism that requires at least two independent hand movements.

11. The illuminated bike horn of claim 7, further comprising a clamp attached to the bike horn to secure the illuminated bike horn to a handlebar.

12. An illuminated bike horn comprising:

a light source and sound sensor coupled to the bike horn, wherein the light source is operable to provide illumination in response to the bike horn emitting sound; and a mounting device configured as a bar to attach to a mouth of the bike horn at two discrete mount locations along a circumference of the mouth, wherein the light source and sound sensor are positioned between the mouthing device and bike horn.

13. The illuminated bike horn of claim 12, wherein the bike horn emits sound in response to movement of a diaphragm coupled to a bell of the bike horn.

14. The illuminated bike horn of claim 13, wherein the light source is a red-green-blue (RGB) light emitting diode (LED) configured to provide illumination in a plurality of colors.

15. The illuminated bike horn of claim 14, wherein the LED is configured to change colors while providing illumination.

16. An illuminated bike horn comprising:

a light source and sound sensor, wherein the light source is operable to provide illumination in response to the bike horn emitting sound; and a mounting device configured to attach to a mouth of the bike and including a bay configured to receive the light source and sound sensor, wherein the bay secures the light source and sound sensor between the mounting device and bike horn.

17. The illuminated bike horn of claim 16, further comprising a power source, wherein the power source, light source, and sound sensor are secured between the bay and a cover.

18. The illuminated bike horn of claim 17, wherein the cover is secured to the bay via a pair of screws.

19. The illuminated bike horn of claim 18, wherein the cover is secured to the bay via a snap clip assembly.

20. The illuminated bike horn of claim 18, wherein the cover is secured to the bay by a mechanism that requires at least two independent hand movements.

* * * * *